WIRELESS MICROPHONE TRANSMITTER

Filed July 2, 1960 2 Sheets-Sheet 1

INVENTORS
PETER K. ONNIGIAN
KEITH KIRSTEIN
BY Lothrop & West
ATTORNEYS

Oct. 1, 1963 P. K. ONNIGIAN ETAL 3,105,938

WIRELESS MICROPHONE TRANSMITTER

Filed July 2, 1960 2 Sheets-Sheet 2

INVENTORS
PETER K. ONNIGIAN
KEITH KIRSTEIN

BY Lothrop & West

ATTORNEYS

United States Patent Office 3,105,938

Patented Oct. 1, 1963

3,105,938

WIRELESS MICROPHONE TRANSMITTER

Peter K. Onnigian, 1236 40th Ave., Sacramento, Calif., and Keith Kirstein, 3351 Holly Drive, Sacramento 21, Calif.

Filed July 2, 1959, Ser. No. 824,513
1 Claim. (Cl. 325—105)

The invention relates to radio transmitters and, more particularly, to very small, portable frequency-modulated transmitters.

In the television broadcasting industry cords on microphones present production problems. These problems include the use of manpower to operate mike booms, limitations to lighting of sets, and limitations to physical movement around a set. There are also some problems in directing, which limit the director to medium and close shots to avoid the boom and boom shadows.

There are currently several makes of wireless microphones on the market. Some are too bulky, being in several units, while others do not have the sound quality necessary for TV broadcasting. Interference is also a problem with some units.

It is therefore an object of the invention to provide a wireless microphone which is complete and self-sufficient in a very small package.

It is another object of the invention to provide a transmitter which is crystal controlled.

It is a further object of the invention to provide an extremely light and portable radio transmitter yet one which has sufficient power to overcome interference.

It is still a further object of the invention to provide a radio transmitter which is transistorized.

It is a further object of the invention to provide a radio transmitter using FM modulation.

It is still a further object of the invention to provide a wireless microphone having an over-all response of thirty cycles to sixteen thousand cycles per second.

It is yet a further object of the invention to provide a sealed encapsulated wireless microphone which is impervious to the atmosphere.

It is still a further object of the invention to provide a radio transmitter wherein there are no switches, controls or exterior antenna and which therefore is secure from mal-adjustment by non-technical personnel.

It is yet another object of the invention to provide a radio transmitter wherein the source of electrical energy can be easily removed and replaced in a fool-proof fashion.

It is yet another object of the invention to provide a radio transmitter wherein the transmitter capsule can be divided into two parts and wherein the action of separating the two parts or joining them together serves to turn the unit off and on.

It is still another object of the invention to provide a very small dependable radio transmitter unit which is extremely rugged and free from mal-function.

It is still another object of the invention to provide a generally improved portable radio transmitter.

Other objects together with the foregoing are attained in the following description and shown in the accompanying drawings in which.

Figures 1, 2:
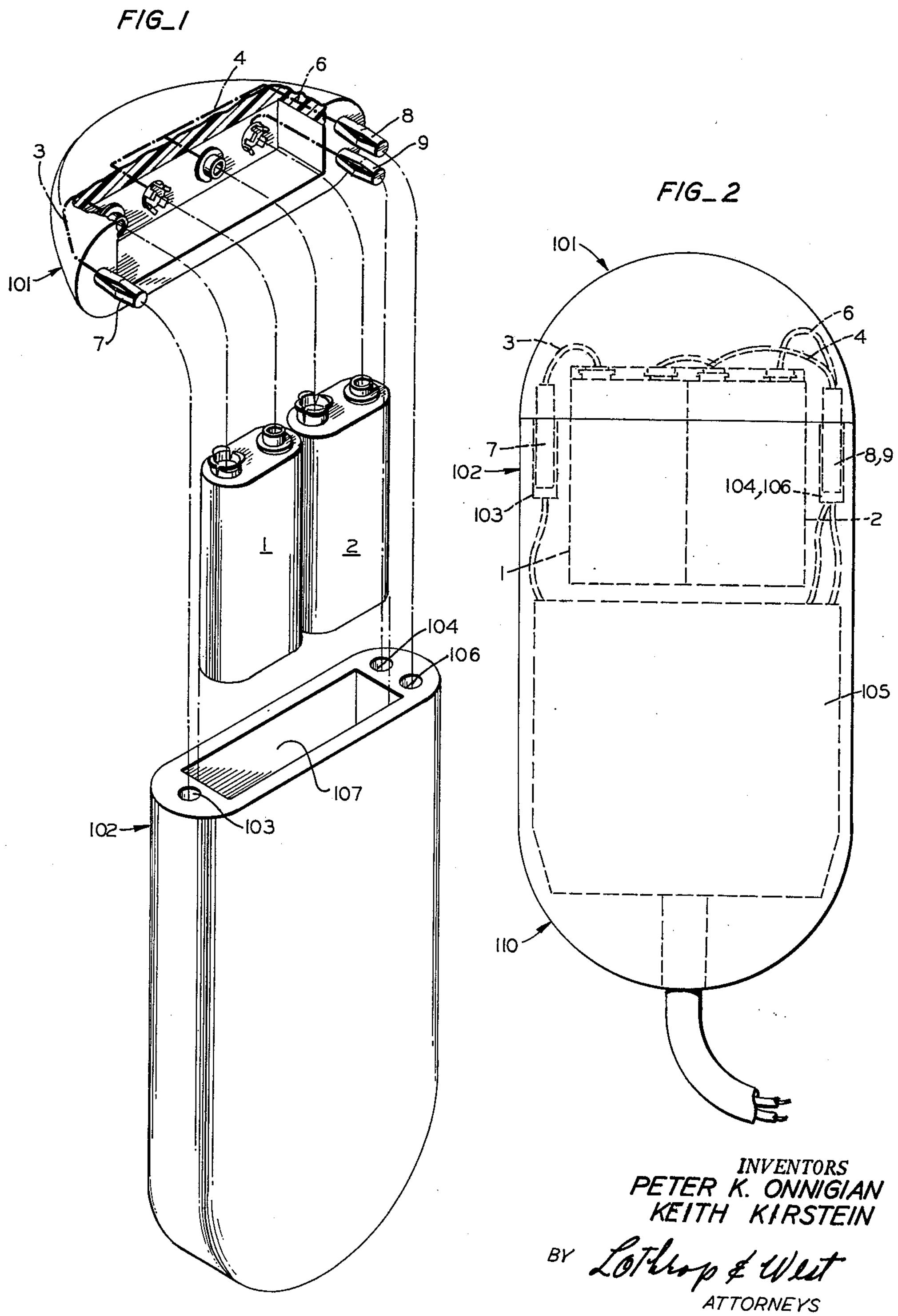
FIGURE 1 is an exploded perspective of the transmitter capsule and the attendant power source.
FIGURE 2 is a side elevation of the assembled unit showing in outline the major elements of the unit.
Figure 3:
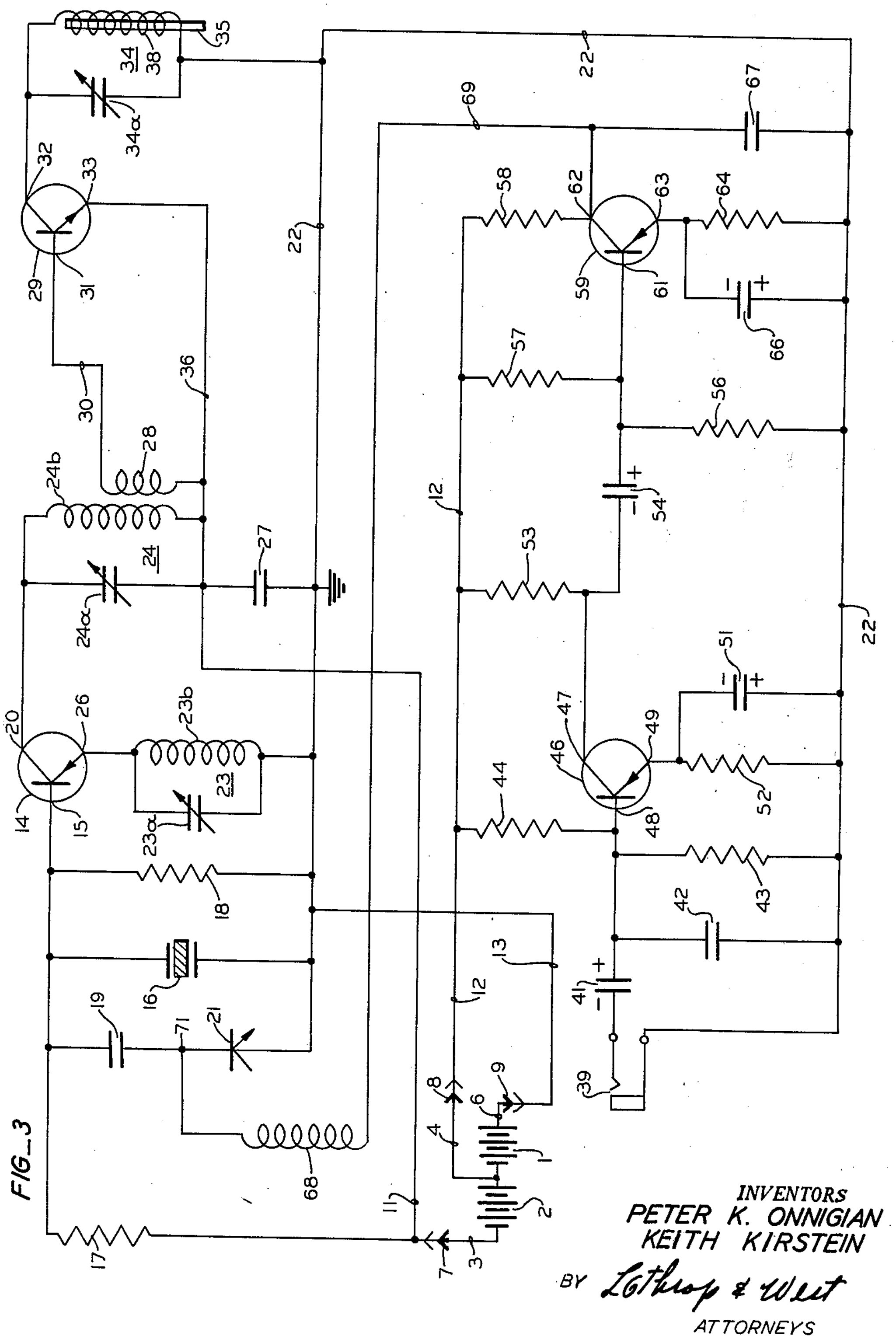
FIGURE 3 is a circuit diagram of the circuitry involved in the transmitter.

FIGURES 1 and 2 particularly emphasize the mechanical aspects of the transmitter whereas FIGURE 3 relates to the electrical portion thereof.

While the wireless microphone of the invention is susceptible of numerous physical embodiments depending upon the environment and requirements of use, considerable numbers of the herein shown and described embodiment have been made, tested extensively and used, particularly in connection with TV broadcasting, and all have performed in an eminently satisfactory fashion.

The small, portable frequency-modulated transmitter of the invention comprises a D.C. power source such as dry cells 1 and 2 and connecting wires 3, 4 and 6 terminating in male connecting pins 7, 8 and 9. The power source is contained in a moulded plastic cover receptacle 101 detachable from and mating with a moulded plastic base case 102. When the parts are assembled, firm electrical and mechanical connection is made by the friction fit of the pins 7, 8 and 9 with matching sockets 103, 104 and 106 in the case 102, space for the power source being provided by a recess 107 molded into said case 102. The principal electrical circuitry is cast into the case 102 after initial construction on an insulating board 105 shown in outline in FIGURE 2.

The transmitter 110 comprises radio-frequency generating means, radio-frequency amplifying and radiating means, voice-frequency amplifying means, and means for the frequency modulation of the generated radio-frequency currents, all being hereinafter described in detail.

The electrical circuitry of the transmitter means comprises not only the direct current power cells 1 and 2, connecting wires 3, 4 and 6, connecting pins 7, 8 and 9 and connecting sockets 103, 104 and 106, but it also includes further connecting leads 11, 12 and 13, thus providing operating power for a transistor generator of radio-frequency currents, an amplifier for the radio-frequency currents, and frequency modulation means for said generator means and amplifier means.

The radio-frequency generator comprises a transistor 14, a frequency determining piezo-electric crystal 16 connected from the base electrode 15 of the transistor 14 to a circuit common 22, a bias resistor 17 connected between the lead 11 and the base electrode 15, a further bias resistor 18 connected from the base electrode 15 to the circuit common 22, a capacitor 19 connected in series with a voltage-variable capacitor 21, the capacitors 19 and 21 being shunted also from the base electrode 15 to the circuit common 22, and a parallel resonant circuit 23 connected from the emitter electrode 26 of the transistor 14 to the circuit common 22. The resonant circuit 23 includes a variable capacitor 23a and an inductance 23b. There is also provided another parallel resonant circuit 24 connected from the collector electrode 20 of the transistor 14 to the power source lead 11. The resonant circuit 24 includes a variable capacitor 24a and a inductance 24b. Shunted across the power lead 11 and the circuit common 22, at the connection of the power lead 11 to the resonant circuit 24, is a capacitor 27 for the purpose of bypassing to the circuit common 22 and keeping from the D.C. power sources 1 and 2 any radio-frequency voltages.

Inductively coupled to the inductance 24b of the resonant circuit 24 by a coil 28 is a high frequency amplifier. This comprises a transistor 29 having one lead 30 of the coil 28 connected to its base electrode 31 and having the remaining lead 36 of the coil 28 connected to the transistor emitter electrode 33. The wire 36 also connects with the lead 11 at the junction of the capacitor 27 and the resonant circuit 24. A resonant circuit 34 is connected between the collector electrode 32 of the transistor 29 and the circuit common 22. The resonant circuit 34 has a variable capacitor 34a and has an inductance 38 wound on a cylinder of ferrite material 35, the ferrite material 35 serving as a radiating antenna for the transmitter.

Frequency modulation of the transmitter means is obtained through the voltage-variable capacitor 21. The capacitor 21 undergoes an alteration in value of capacity when subjected to a change in the voltage impressed across it. Such alteration is typical of certain semi-conductor junction diodes operated with a voltage applied such that there is essentially no direct current flow through the junction diode. Further, the instantaneous frequency of oscillation of the radio-frequency generator is dependent upon the value of capacity shunted across the crystal 16. Therefore, if the voltage across the capacitor 21 changes, the total capacity in shunt with the crystal will change and the instantaneous frequency of the generator will change. Furthermore, if the voltage across the capacitor 21 is made to change at a rate corresponding to the variation in the voltage generated by a microphone, when in a field of sound, the frequency of the signal of the radio-frequency generator will change at a corresponding rate. Suitable receiver means will then allow demodulation and reproduction of the original sound-induced microphone voltage.

The transmitter also includes modulating means comprising a two-stage audio-frequency transistor amplifier means and connecting means to the voltage-variable capacitor 21. The first stage of the audio-frequency amplifier comprises a microphone input connector 39, a capacitor 41 to pass low frequency alternating currents and to prevent direct currents from appearing at the base connector 31, and a capacitor 42 connected from the base electrode 48 of an amplifier transistor 46 to the circuit common 22 in order to shunt any radio-frequency currents to the common 22. There is also provided a bias resistor 44 connected from the wire 12 to the base electrode 48, a further bias resistor 43 connected from the base electrode 48 to the circuit common 22 and another bias and temperature stabilization resistor 52 connected from the emitter electrode 49 of the transistor 46 to the circuit common 22. The resistor 52 has, in shunt, a capacitor 51 for the purpose of removing alternating current from the emitter electrode 49. From the collector electrode 47 of the transistor 46 a load resistor 53 is connected to the power lead 12.

Coupling means for the amplified audio-frequency currents from the first amplifier stage to a second amplifier stage comprise a capacitor 54 connected between the collector electrode 47 and a base electrode 61 of an amplifier transistor 59.

Further amplification of audio-frequency currents is provided by the second stage amplifier means comprising the amplifier transistor 59, a bias resistor 57 connected from the base electrode 61 of the transistor 59 to the power source lead 12, and a further bias resistor 56 connected from the base electrode 61 to the circuit common 22. In addition, there is still a further biasing and temperature stabilization resistor 64 connected from the emitter electrode 63 of the transistor 59 to the circuit common 22, the resistor 64 having in shunt with it a bypass capacitor 66 placed to remove alternating currents from the emitter electrode 63.

Shunted from the collector electrode 62 of the transistor 59 to the circuit common 22 is a capacitor 67. This shorts out of the modulator amplifier, with no disturbance to audio-frequency currents, any radio-frequency currents which might leak through the voltage-variable capacitor connection. This connection includes an inductor 68 joined by a lead 69 from the collector electrode 62 to the junction point 71 of the fixed capacitor 19 and the voltage-variable capacitor 21. The inductor 68 acts as a block to radio-frequency currents but allows audio-frequency voltages to appear between the junction 71 of the capacitor 19 and the voltage-variable capacitor 21 and common circuit 22. Also connected to the collector electrode 62 is a load resistor 58 having its other connection to power source lead 12.

The transmitter, as above described, is capable of transmission of voice and music via radio-frequency propagation, using frequency modulation of an oscillator, the mean frequency of which is accurately controlled by a piezo-electric quartz crystal. The device is small in size, is susceptible of miniaturization, as by printed circuits, and is fool-proof as well as being rugged and durable. It can easily be carried on the person in close association with a personal microphone and thus does away with the difficulties initially described.

What is claimed is:

A portable radio transmitter comprising:

(*a*) an electrical circuit including a plurality of transistors and a quartz crystal, said circuit being capable of controlling the mean signal frequency of said transmitter;

(*b*) a voltage variable capacitor connected with said circuit, the capacity of said capacitor being varied with the impressed voltage, said capacitor being effective to vary said mean signal frequency at an audio rate;

(*c*) an antenna comprising a high permeability ferrite rod excited by the radio frequency energy of said transmitter to produce magnetic radiation;

(*d*) an exteriorly smoothed plastic block having cast entirely therein said circuit, said capacitor and said antenna in fixed spatial relation, said block being provided with a recess to receive a power source;

(*e*) a power source disposed within said recess; and (*f*) a recessed plastic cap adapted to engage said block and to form therewith a smooth exteriorly uninterrupted case, said cap including a plurality of members adapted to connect with said power source only when said cap is engaged with said block.

References Cited in the file of this patent

UNITED STATES PATENTS

| | | |
|---|---|---|
| 2,820,145 | Wolfendale | Jan. 14, 1958 |
| 2,879,486 | Reed | Mar. 24, 1959 |
| 2,917,633 | Richards | Dec. 15, 1959 |
| 2,936,428 | Schweitzer | May 10, 1960 |
| 2,972,120 | Kircher et al. | Feb. 14, 1961 |
| 2,999,926 | Jenny | Sept. 12, 1961 |

FOREIGN PATENTS

| | | |
|---|---|---|
| 561,323 | Great Britain | May 15, 1944 |

OTHER REFERENCES

Article: "Radio Up Your Sleeve," pages 133–136, 248 of Popular Mechanics, April 1950.

Pub. I, "Transistorized Transmitter," by J. Chernof, Radio and TV News, October 1956, pages 58–59.